Patented Sept. 25, 1951

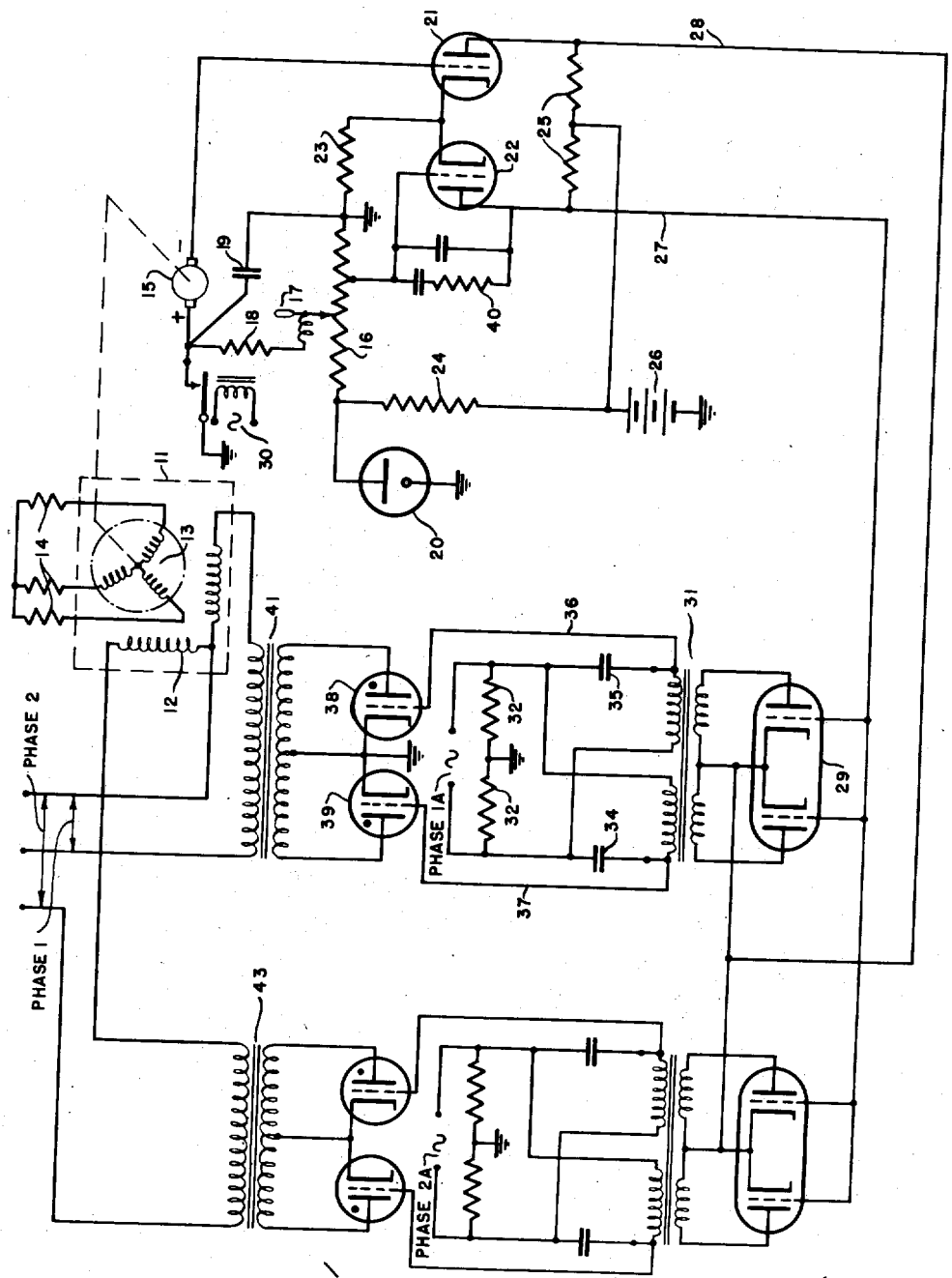

2,568,701

UNITED STATES PATENT OFFICE 2,568,701

MOTOR SPEED CONTROL

Paul F. Arnold, Hempstead, N. Y., assignor to The Sperry Corporation, a corporation of Delaware Application October 11, 1946, Serial No. 702,794

8 Claims. (Cl. 318—229)

1

This invention relates to motor speed control systems and, in particular, to speed control systems for motors having one or more voltage controllable windings or elements.

In accordance with a preferred embodiment and as one example of the instant invention, a motor speed control system for a motor having a voltage controllable element such as a separate field winding is provided, wherein the excitation of the separate field, and thusly the motor speed, is automatically controlled in response to a signal. Furthermore, the signal or the voltage supplied to the field may be varied in accordance with motor speed variations as shown in the drawing. Novel amplifying means for the various control signal voltages is also provided.

A further feature and a primary object of the present invention resides in providing a control system in which the output from the voltage amplifying means is applied to a variable impedance device, which is in circuit with the separate motor field and its source of excitation, in a manner whereby variations in output from the amplifier serve to vary the impedance of said variable impedance device and thereby vary the field excitation and motor speed.

In the system of the instant invention, a speed control that operates smoothly from top speed to creep speeds and from no load to full load is provided. Furthermore, the system described may be advantageously employed in conjunction with the voltage energized, speed controlling element of any motor such as the field windings, armature and the like and with either single-phase or polyphase motors, inasmuch as, in the latter cases, the phase relationship of the separate fields will be undisturbed.

A further object of the present invention resides in providing variable impedance means, in the form of a transformer, having its primary connected in circuit with the field winding, and its secondary being connected in circuit with the amplified control signal, thereby affording means for varying the excitation of the field winding in accordance with said control signal.

A still further object resides in controlling the impedance of the variable impedance means by shifting the firing point of a thyratron in accordance with the amplified control signal.

Other objects and advantages will become apparent from the specification taken in connection with the accompanying drawing, wherein a schematic diagram of a speed control system embodying the instant invention as applied to a two-phase induction motor is set forth.

Referring now to the drawing, the motor 11 is provided with a speed responsive signal generating means such as a permanent magnet generator 15 coupled to the motor rotor 13. The output from the generator 15 will vary in accordance with the rotor speed of the motor 11. In order to obtain a resultant input signal for the amplifier hereinafter described that will reflect variations of motor speed, a potentiometer 16, having an adjustable pick-off 17, is placed in circuit with resistor 18, which in turn is connected to the positive terminal of the generator 15. Potentiometer 16 is provided with a tap connecting the potentiometer to the grid of a vacuum tube such as the triode 22. A second vacuum tube such as the triode 21, connected in push-pull relationship with the triode 22, has its grid connected to the negative terminal of the generator 15. The cathodes of both triodes 21 and 22 are connected through the resistor 23 to ground. The plates of tubes 21 and 22 are joined across a resistor 25 which in turn is connected at its midpoint to a source of potential 26, and through resistor 24 to potentiometer 16. The constant voltage source 20, is also connected to this side of the potentiometer. A capacitance-resistance network 40 may be connected across the grid-anode of the tube 22, to serve as a filter. A similar network may also be connected across the grid-anode of the other tube 21.

In order to provide motor starting at a reduced voltage, the normally closed relay 30, which acts to ground the positive terminal of the generator 15 before the motor is started, is inserted into the circuit. Thusly, after the motor is energized, the condenser 19 must become charged in some extent before the potential from the generator 15 wil become great enough to provide an appreciable current through resistor 18. During this time, the remainder of the circuit is inoperative, and hence the motor is started without the demand for an increased excitation voltage by the system to be described herein.

The circuit including the tubes 21 and 22 with the associated network, serves to establish a double ended output, on wires 27 and 28. that is responsive to a single ended input, from the P. M. generator 15. Thus for any given setting of the pick-off 17 on the potentiometer 16, if the output from the P. M. generator 15 does not algebraically equal the signal transmitted from the potentiometer 16, a signal will appear across lines 27, 28 (which will be evidence of the fact that the motor speed is too slow). This signal will be of a nature tending to drive the potential of line 27 more positive with respect to line 28. However, should the motor speed be too great for any given setting of the pick-off 17 on the potentiometer 16, the P. M. generator will transmit a signal to the combining circuit which, being greater than the signal from the potentiometer 16, will tend to drive the potential of line 28 more positive with respect to line 27. In the manner set forth, the potential of either line 27 or line 28 is driven more positive with respect to the other lines, depending upon whether the signal generated in response to the motor speed is greater or smaller than the signal that is responsive to the setting of pick-off 17 on potentiometer 16.

Now that a signal varying with motor speed variations has been provided, amplifying means for that signal are provided, which amplifying means function, in accordance with the present invention, to control the motor speed in accordance with said signal and in a novel manner. To achieve this end, an electronic circuit is provided having an input electron tube, in this instance the duo-triode 29. The grids and the cathodes of tube 29 are connected to lines 27 and 28, respectively, to receive the signal derived from the combining circuit, hereinbefore described. An A. C. source of potential (Phase 1A) is supplied to the plates of tube 29 through a phase shifting network to be presently described.

Preferably, a transformer such as transformer 31 is employed to supply potentials to the plates of tube 29 so that said transformer may function as a variable impedance in the associated phase shifting network connected with the primary thereof. The center tap of its secondary is connected to the cathodes of tube 29, the entire secondary being placed across the plates of tube 29. An impedance-capacitance phase shifting network, including the condensers 34 and 35, each being in series with one half of the primary of transformer 31, together with the center grounded resistor 32, is connected across the A. C. source (Phase 1A). Thus the capacitance-impedance phase shifting network is coupled with the plate-cathode circuit of the input tube 29. As the signal that varies with motor speed variations is transmitted along lines 27 and 28, the conductance of tube 29 will vary in accordance with that signal. In response to conductance variations in tube 29, the impedance of the secondary of transformer 31 will correspondingly vary and hence, the impedance of the primary of transformer 31 will also be varied. Impedance variations in the primary of transformer 31 will serve to shift the phase of the supply voltage from Phase 1A in a proportionate amount. Also coupled to this phase shifting network is a pair of tubes 38 and 39, which may be of the thyratron type,—having their grids connected to receive this phase shifted signal. The grids of tubes 38 and 39 have been connected to receive the output from the phase shifting amplifier in order that, as a consequence of such a phase shift, the firing point of these tubes will accordingly be controlled. Thus, the amount of conduction of tubes 38, 39 on each positive half of their plate potentials will vary with variations in the phase relation of the grid potentials to said plate potentials. Phase shifting of such grid potentials is produced by the phase shifting circuit through variations in impedance of the primary of transformer 31 which in turn is controlled by tube 29 and the signal that varies with variations in motor speed.

A two-part variable impedance, herein appears as the transformer 41, having the center tap of its secondary connected in the plate-cathode circuit of the tubes 38 and 39, the tubes being connected in a push-pull arrangement. As the phase angle of the grid control for tubes 38 and 39 is shifted in the connecting lines 36 and 37, the tubes 38 and 39 will respond by varying their firing point, and the impedance of the secondary of transformer 41 will correspondingly vary. By connecting the primary winding of transformer 41 in circuit with one phase of the motor field winding and its source of excitation, Phase 1, variations of impedance in the the secondary of transformer 41 will effect similar variations in its primary impedance and hence the impedance in series with one phase of the separate field 12 will vary.

A second phase-shifting amplifier circuit 42, identical in every respect to the circuit previously described, affords a corresponding impedance variation in transformer 43, which in turn is connected in series with the second phase of winding 12 and its source of excitation, Phase 2. However, to preserve the 90° phase relationship that exists between Phase 1 and Phase 2, this same 90° relationship must be provided in the A. C. sources for the amplifiers designated as Phases 1A and 2A. Thus as the field excitation phases have been preserved, the impedance in transformers 41 and 43 will vary uniformly in response to the signal output that is in accordance with motor speed variations, thereby raising or lowering the potential applied to the motor field winding 12, and hence vary the motor speed in a sense tending to maintain that speed at any value desired.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a speed control system, a motor having a field winding, an A. C. power source, a variable impedance comprising a first winding in circuit with said motor winding and said A. C. power source and a second winding, an electronic amplifier having an input electron tube and an output electron tube, a source of signal voltage connected to the grid of said input tube, an A. C. source of plate potential, an impedance-capacitance phase shifting network connected with said potential source and with the grid of said output tube, said network comprising impedance means coupling said network with the plate-cathode circuit of said input tube, and the grid of said output tube being connected to receive the phase-shifted voltage from said network, the extent of phase shift being dependent on the impedance valve of said coupling and the conductance of said input tube, and said output electron tube being connected in circuit with the second winding of said variable impedance whereby to control the valve of said impedance in accordance with the magnitude of said signal voltage.

2. A speed control system for a motor having a winding comprising means for producing a control signal having a component varying in magnitude with variations in motor speed, amplifier means for said signal including an input electron tube having its grid connected to said signal, a source of A. C. plate potential, an output electron tube, a phase shifting network connected to said A. C. source and with the grid of said output tube, said network including impedance means for coupling said network with the plate-cathode circuit of said input tube, the grid of said output tube being connected to receive the phase shifted voltage from said network, the extent of shift being dependent upon said signal, a transformer having a center tapped secondary connected in the plate-cathode circuit of said output electron tube and the primary of said transformer being connected in series with the motor winding.

3. In a speed control system, a motor having a winding, a source of signal voltage, an electronic amplifier for shifting the phase of an A. C. reference source of potential in response to said control signal voltage and comprising a pair of input electron tubes in push-pull relationship having their grid connected to said signal and their plates connected for energization from the A. C. reference potential, a pair of output electron tubes in push-pull relationship, an impedance-capacitance phase shifting network connected with said A. C. source and with the grids of said output tubes, said network comprising impedance means coupling said network with the plate-cathode circuits of said input tubes, and the grids of said output tubes being connected to receive the phase shifted voltage from said network, the extent of shift being dependent on the impedance of said coupling and the conductance of said input tubes an A. C. power source, and a variable impedance including one winding connected in circuit with the motor winding and said A. C. power source and a second winding connected in the output circuit of said output electron tubes whereby the impedance of said variable impedance in circuit with said motor is varied in accordance with the magnitude of the signal voltage.

4. A speed control system for a motor having a winding, said system comprising control signal-producing means, amplifying means for said control signal including a source of A. C. an impedance capacitance phase shifting network having an output and having its input connected to said A. C. source, and means responsive to said amplified control signal for controlling the phase shift produced by said network, said last-mentioned means including coupling means interconnecting said amplified control signal with said network, variable impedance means in circuit with said motor winding, and means connected with the output of said network for varying said impedance in accordance with variations in said control signal.

5. A speed control system for an induction motor having a polyphase winding, said system comprising control signal-producing means, amplifying means for said control signal including a source of A. C., an impedance capacitance phase shifting network having an output and having its circuit connected to said A. C. source, means responsive to said control signal for controlling the phase shift produced by said network, variable impedance means in circuit with each phase of said polyphase motor winding, and means for varying said impedance in accordance with variations in said control signal.

6. In a speed control system, an A. C. motor having a field winding, an A. C. power source, a transformer comprising a primary and secondary winding, said primary winding being connected in circuit with the motor field winding and said A. C. power source, electron tube means comprising a control electrode and having its space discharge path connected in circuit with the transformer secondary winding, an alternating potential source, a variable phase-shifting network connecting said alternating potential source with the control electrode of said electron tube means, settable means for producing a first control signal, means for producing a second control signal dependent upon motor speed, and means for varying the phase shift produced by said phase shifting network in accordance with the algebraic sum of said control signals.

7. In a speed control system, a polyphase A. C. motor having a plurality of field windings, a polyphase A. C. power source, a plurality of transformer means each comprising a primary and secondary winding, the primary windings being connected respectively in circuit with the motor field windings and said polyphase A. C. power source, a plurality of electron tubes each comprising a control electrode and a plate and cathode, the plates and cathodes of said tube means being connected respectively in circuit with the secondary windings of said transformer means, a control circuit for each of said electron tubes comprising an alternating potential source and a variable phase-shifting network connecting the current source with the control electrode of the associated electron tube whereby the impedances of said transformer means are dependent upon the phase relation of the potential applied to the control electrode of the associated electron tube with respect to the phase of the A. C. power source with which the respective transformers are energized, a control signal source, and means responsive to the control signal for controlling the amount of phase shift produced by the respective phase-shifting means.

8. In a speed control system, an A. C. motor having a field winding, an A. C. power source, a variable impedance comprising a core and a first winding in circuit with said motor winding and said A. C. power source and a second winding, electron tube means comprising a control electrode and having its plate and cathode connected in circuit with the second winding of said impedance, an alternating potential source, a variable phase-shifting means connecting said potential source with the control electrode of said electron tube means whereby the value of said impedance upon the phase relation of the potential on the control electrode of said tube means to the A. C. power source, a source of control signal, and means for varying the phase shift produced by said phase-shifting means in accordance with the magnitude of said control signal.

PAUL F. ARNOLD.

REFERENCES CITED

The following references are of record in the file of this patent:

UNITED STATES PATENTS

| Number | Name | Date |
| --- | --- | --- |
| 1,376,453 | Meyer | May 3, 1921 |
| 1,963,246 | Purington | June 19, 1934 |
| 2,032,176 | Kovalsky | Feb. 25, 1936 |
| 2,202,172 | Stoller | May 28, 1940 |
| 2,287,459 | Uehling | June 23, 1942 |
| 2,421,632 | Livingston | June 3, 1947 |
| 2,462,751 | Koehler | Feb. 22, 1949 |
| 2,463,463 | Izenour | Mar. 1, 1949 |

FOREIGN PATENTS

| Number | Country | Date |
| --- | --- | --- |
| 747,996 | France | Apr. 10, 1933 |

Certificate of Correction

Patent No. 2,568,701 September 25, 1951

PAUL F. ARNOLD

It is hereby certified that error appears in the printed specification of the above numbered patent requiring correction as follows:

Column 4, line 55, for "valve" read *value*; column 5, line 13, for "grid" read *grids*; column 6, line 47, after "impedance" insert *is dependent*;

and that the said Letters Patent should be read as corrected above, so that the same may conform to the record of the case in the Patent Office.

Signed and sealed this 15th day of January, A. D. 1952.

[SEAL]

THOMAS F. MURPHY,
*Assistant Commissioner of Patents.*